(12) United States Patent
Geetha et al.

(10) Patent No.: US 11,176,574 B2
(45) Date of Patent: Nov. 16, 2021

(54) CONTEXTUAL SECONDARY CONTENT FOR SEARCH RESULTS

(71) Applicant: eBay Inc., San Jose, CA (US)

(72) Inventors: Gayathri Ravichandran Geetha, Sunnyvale, CA (US); Harita Yenisetty, Sunnyvale, CA (US); Bhavani Kumar Hari, Campbell, CA (US); Jesse Kiefer, Los Gatos, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 16/382,391

(22) Filed: Apr. 12, 2019

(65) Prior Publication Data

US 2019/0236647 A1 Aug. 1, 2019

Related U.S. Application Data

(63) Continuation of application No. 14/584,862, filed on Dec. 29, 2014, now abandoned.

(60) Provisional application No. 61/975,436, filed on Apr. 4, 2014.

(51) Int. Cl.
*G06Q 30/00* (2012.01)
*G06Q 30/02* (2012.01)

(52) U.S. Cl.
CPC ................ *G06Q 30/0256* (2013.01)

(58) Field of Classification Search
CPC .................................................. G06Q 30/0256
See application file for complete search history.

(56) References Cited

U.S. PATENT DOCUMENTS

| 5,838,687 | A | 11/1998 | Ramfelt |
| 7,478,121 | B1* | 1/2009 | Nickerson ............ G06Q 30/02 709/203 |
| 8,346,753 | B2* | 1/2013 | Hayes .................. G06F 16/951 707/709 |
| 8,484,075 | B1 | 7/2013 | Yan et al. |

(Continued)

OTHER PUBLICATIONS

Advisory Action received for U.S. Appl. No. 14/584,862, dated May 16, 2018, 3 pages.
(Continued)

*Primary Examiner* — Scott C Anderson
(74) *Attorney, Agent, or Firm* — Shook, Hardy & Bacon L.L.P.

(57) ABSTRACT

A search server is configured to return secondary content associated with primary content determined to be relevant to a search query. One or more databases store: (1) information identifying primary content items returnable as search results, (2) information identifying secondary content items, and (3) data identifying associations among the primary content items and the secondary content items. When the search server receives a search query, the one or more databases are queried to identify primary content items relevant to the search query. Additionally, the one or more databases are queried to identify secondary content items associated with the identified primary content items. The secondary content items can be selected based on a number of the identified primary content items associated with each secondary content item in the one or more databases. The identified primary content items and selected secondary content items are returned as a response to the search query.

20 Claims, 14 Drawing Sheets

(56) References Cited

U.S. PATENT DOCUMENTS

| | | | |
|---|---|---|---|
| 2004/0153363 A1 | 8/2004 | Stehling | |
| 2004/0244029 A1* | 12/2004 | Gross | G06Q 30/02 |
| | | | 725/9 |
| 2005/0256766 A1* | 11/2005 | Garcia | G06F 16/9537 |
| | | | 705/14.54 |
| 2007/0156621 A1 | 7/2007 | Wright et al. | |
| 2007/0192314 A1 | 8/2007 | Heggem | |
| 2008/0052152 A1 | 2/2008 | Yufik | |
| 2009/0106070 A1 | 4/2009 | Konar | |
| 2010/0082410 A1* | 4/2010 | Baudin | G06Q 30/0201 |
| | | | 705/7.29 |
| 2010/0082429 A1 | 4/2010 | Samdadiya et al. | |
| 2011/0295684 A1* | 12/2011 | Lee | G06Q 30/0241 |
| | | | 705/14.49 |
| 2012/0253943 A1* | 10/2012 | Chow | G06Q 30/0255 |
| | | | 705/14.69 |
| 2013/0018723 A1* | 1/2013 | Khanna | G06Q 30/0241 |
| | | | 705/14.49 |
| 2014/0032311 A1* | 1/2014 | Cramer | G06F 16/248 |
| | | | 705/14.45 |
| 2015/0287080 A1 | 10/2015 | Geetha et al. | |

OTHER PUBLICATIONS

Applicant Initiated Interview Summary Received for U.S. Appl. No. 14/584,862, dated Dec. 27, 2018, 3 pages.
Final Office Action received for U.S. Appl. No. 14/584,862, dated Feb. 21, 2019, 11 pages.
Final Office Action received for U.S. Appl. No. 14/584,862, dated Mar. 7, 2018, 29 pages.
First Action Interview Office Action Summary received for U.S. Appl. No. 14/584,862, dated Oct. 27, 2017, 6 pages.
Non-Final Office Action received for U.S. Appl. No. 14/584,862, dated Sep. 25, 2018, 34 pages.
Pre-Interview First Office Action received for U.S. Appl. No. 14/584,862, dated Jun. 21, 2017, 4 pages.
Response to Final Office Action filed on May 3, 2018, for U.S. Appl. No. 14/584,862, dated Mar. 7, 2018, 20 pages.
Response to First Action Interview received for U.S. Appl. No. 14/584,862, filed Dec. 22, 2017, 7 pages.
Response to Non-Final Office Action filed on Dec. 21, 2018, for U.S. Appl. No. 14/584,862, dated Sep. 25, 2018, 19 pages.
Johnson et al., "Four Tips for Effective Online Merchandising Strategies for Boosting Conversion Rates", Retrieved from the internet URL:<http://www.oracle.com/us/products/applications/web-commerce/tips-effective-online-merchandising-1505005.pdf>, Feb. 2012, 12 pages.
Mahajan, "How To Patent Your Idea—3 Easy Steps To Patent & Make Money Get A Free Patent & Invention Kit", Retrieved from the Internet: <URL:http://www.articlesbase.com/online-promotion-articles/targeted-ads-cont>, Jul. 27, 2011, 4 pages.
Pleiter, "How Financial Marketers Can Hit The Bullseye With Contextual Targeting", Retrieved from the internet URL:<https://thefinancialbrand.com/28148/contextual-segment-online-retargeting-in-banking/>, The Financial Brand, Mar. 14, 2013, 4 pages.
Skinner, "User Context Sensitive Searching in Sharepoint 2013 Part", Retrieved from the Internet: <URL:https://richardstk.com/2013/07/12/user-context-sensitive-searching-in-sharepoint-2013-part-1/>, Jul. 12, 2013, Accessed Dec. 26, 2014, 14 pages.

* cited by examiner

510
Great Offers  With free shipping
 New Rocketfish
Gaming
Headset 3D
$29.99
 Monster DNA
On-Ear
Headphones
$79.93
$199.95
60% off!
 Monster DNA
On-Ear
Headphones
$79.93
$199.95
60% off!
520
Sale Event  Prepare for Winter
WINTER PREP
Up to 40% Off
FREE SHIPPING
 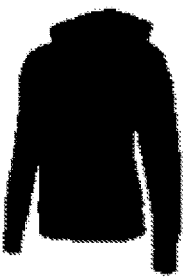 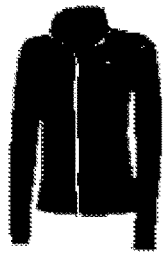 
*FIG. 5*

1100

1110 — Item: Item ID | Name | Description | Category | Price

1120 — Query: Query ID | User ID | Context ID | Session ID

1130 — Context: Context ID | Timestamp | Browser | Device | Location

1140 — Query Keywords: Query ID | Keyword

1150 — Item Promotions: Item ID | Promotion ID

1160 — Promotion: Promotion ID | Name | Category | Successes | Success Rate | Weight

1170 — Promotion History: Promotion ID | Query ID

1180 — Session: Session ID | SuccessFlag

1190 — Promotion Selection: Recall | Query | User | Context

*FIG. 11*

CONTEXTUAL SECONDARY CONTENT FOR SEARCH RESULTS

CROSS-REFERENCE TO RELATED APPLICATIONS

This patent application is a continuation of U.S. patent application Ser. No. 14/584,862, filed Dec. 29, 2014, which claims priority to U.S. Provisional Application No. 61/975,436, filed on Apr. 4, 2014, each of which is incorporated herein by reference in its entirety.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings that form a part of this document: Copyright eBay, Inc. 2014, All Rights Reserved.

TECHNICAL FIELD

The subject matter disclosed herein generally relates to the processing of data. Specifically, in some example embodiments, the present disclosure addresses systems and methods for providing contextual promotions.

BRIEF DESCRIPTION OF THE DRAWINGS

Some embodiments are illustrated by way of example and not limitation in the figures of the accompanying drawings.

FIG. 5 depicts user interfaces, according to some example embodiments, presenting contextual promotions.

FIG. 11 is a block diagram illustrating a database schema suitable for use in selecting contextual promotions, according to some example embodiments.

DETAILED DESCRIPTION

Figure 1:
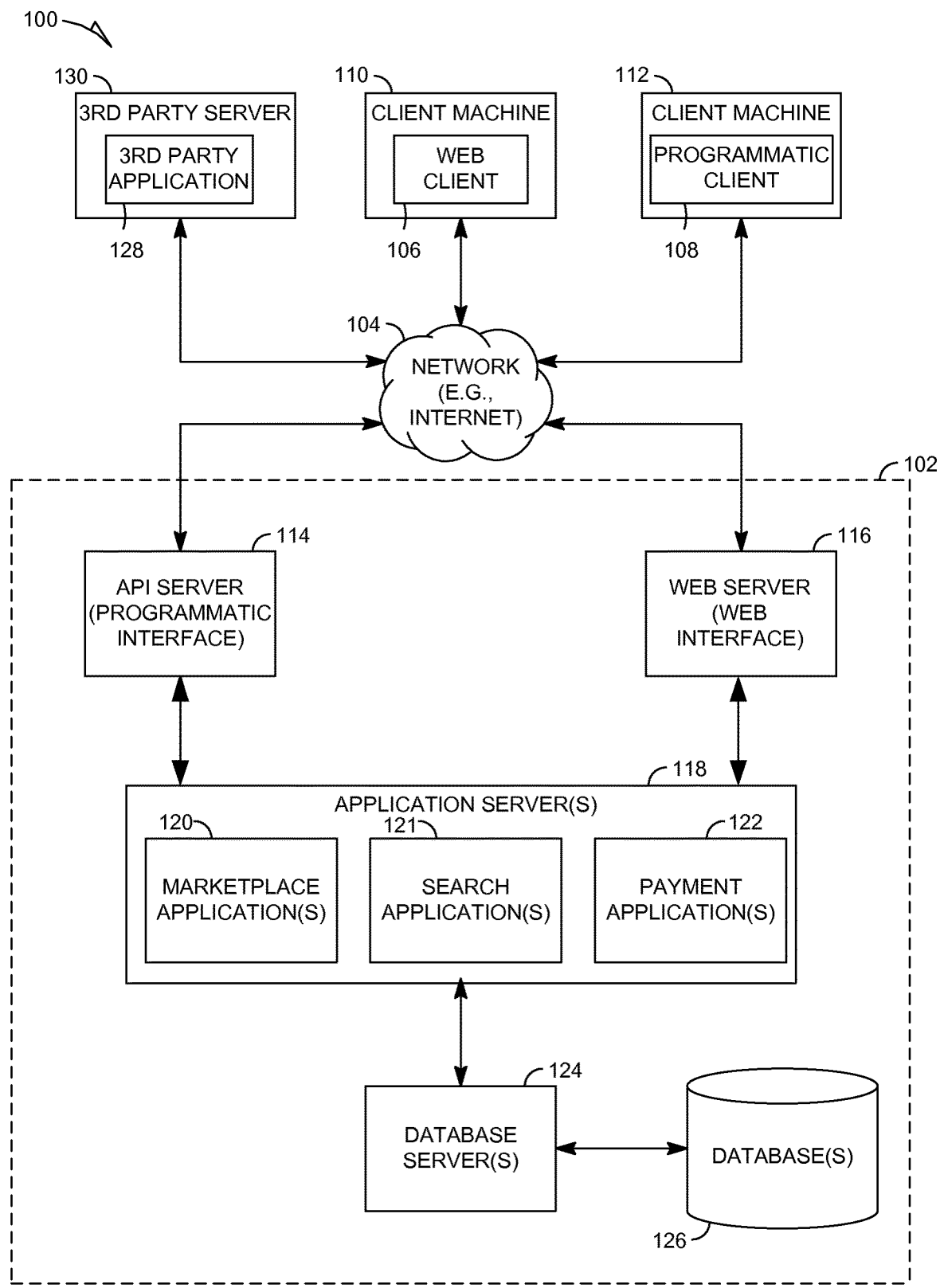
FIG. 1 is a network diagram, according to some example embodiments, illustrating a network environment suitable for contextual promotions.

Example methods and systems are directed to contextual promotions. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

As described in more detail below, a database of available promotions may be created. The promotions may be associated with one or more sellers, one or more product lines, one or more themes, and so on. For example, a seller having a store may pay a promotional fee to have the store promoted. As another example, a company producing a brand may pay a promotional fee to have the brand promoted. As another example, an online marketplace may choose to promote high-volume or high-margin products. As another example, a "daily deal" may be offered, whereby items are identified as being part of the daily deal and the selection of items in the daily deal changes on a daily basis. For example, on Monday the daily deal may be for top-selling shirts while on Tuesday the daily deal may be for highly-rated iPhone accessories. As another example, a "local pickup" promotion may be offered, whereby items from sellers offering local pickup and within a predetermined distance from the user are promoted. As another example, a seasonal event may be offered based on the time of year. For example, a back to school event may be offered in August to coincide with the beginning of the school year. Items associated with the back to school event may include pens, pencils, paper, backpacks, bicycles, clothes, and other items likely to be used by students, parents, or teachers for the school year.

Events may also be offered based on the user's location. For example, a buyer in the United States may see promotions that include items that only ship within the United States, while a buyer in Germany may see promotions with items that ship globally or within Germany.

Events presented may be of different types, and selected based on those types. For example, a query for "purse" may return items associated with multiple promotions. Among those promotions could be a curated collection of vintage purses, a Coach bag event, and a great deal for a Kate Spade bag. Based on these promotions being the most-relevant promotions of each type (curated collection, item category event, and deal for an individual item), these promotions can be presented to the user.

A user may submit a search query to a search engine (e.g., a search application running on an application server). The search engine may process the search query and generate a set of results. Results generated by different search engines for the same search query may be different. For example, one search engine may be geared to providing image results while another is geared to providing shopping results. Continuing with this example, submitting a search query comprising "purse" to the two engines could result in an image of a purse from the first engine and a link to a purse retailer from the second engine. In some example embodiments, the search query is generated automatically for the user. For example, a user may navigate to a general web page for an online marketplace. The general web page may display items to the user based on an automatically generated query. For example, the automatically generated query may request the most popular items, items that are trending upward in popularity, items from a broad range of categories, or otherwise request items to present to the user.

Prior to the search or after the result set for a query is generated, items in the result set may be associated with one or more promotions. For example, a promotion for car accessories may be created and associated with a set of car accessory items. Another promotion for toy trains may be created and associated with a set of toy train items. Based on the associations with promotions in the set of results to the user's query, one or more promotions may be selected for presentation to the user. For example, the user may search using a broad term, such as "car." Based on the search query, results may be generated that include cars, car cleaning products, auto repair tools, car accessories, toy cars, and individual toy train cars. Based on a number of results associated with the car accessory promotion being larger than a number of results associated with the toy train promotion, the car accessory promotion may be selected for presentation to the user.

As described in more detail below, a database of user actions taken after submitting a search query may be created. The actions may be used to recommend promotions to later users submitting the same search query. The search query may have been run before by other users, and the actions of the other users taken in response to receiving a result set for the search query may have been recorded. For example, a database of prior user actions taken after submitting a search query may have been created. The actions of the other users may be used to identify recommended promotions. The recommended promotions may be selected from available promotions in a manner likely to encourage the present user to interact with a selected promotion. For example, if the search query is "digital camera," and various promotions have been presented to other users previously querying for "digital camera," one or more of those promotions may have been interacted with by those other users at a higher frequency than other promotions. The more-frequent-selection of promotions by previous users may be used to predict a higher likelihood that the current user would interact with the promotions. Based on a predicted higher likelihood of interaction, the promotions may be selected for presentation from the available promotions.

A number of selected promotions may be presented. The number of selected promotions may be a constant (e.g., 4), set by the user (e.g., in a preference), or determined on a query-by-query basis. The selected promotions may be presented to the user along with the search results for the query. The selected promotions may be positioned on a screen at a location. The location may be fixed (e.g., the bottom of the screen, at the top of the search results, after the 10th search result, etc.), set by the user, or determined on a query-by-query basis.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or Wide Area Network (WAN)) to one or more clients. FIG. 1 illustrates, for example, a web client 106 (e.g., a browser), and a programmatic client 108 executing on respective client machines 110 and 112.

An Application Program Interface (API) server 114 and a web server 116 are coupled to, and provide programmatic and web interfaces respectively to, one or more application servers 118. The application servers 118 host one or more marketplace applications 120, search applications 121, and payment applications 122. The application servers 118 are, in turn, shown to be coupled to one or more databases servers 124 that facilitate access to one or more databases 126.

The marketplace applications 120 may provide a number of marketplace functions and services to users that access the networked system 102. The search applications 121 may provide a number of search functions and services to users that access the networked system 102. The search applications 121 may allow users to submit queries and receive results responsive to the queries. The search applications 121 may be linked to or part of the marketplace applications 120. Accordingly, searches may be run by the search application 121 to find items for sale through the marketplace applications 120. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace, search, and payment applications 120, 121, and 122 are shown in FIG. 1 to each form part of the networked system 102, it will be appreciated that, in alternative embodiments, the search applications 121 may form part of a search service that is separate and distinct from the networked system 102. Likewise, the payment applications 122 may form part of a payment service that is separate and distinct from the networked system 102.

Further, while the system 100 shown in FIG. 1 employs a client-server architecture, the present invention is of course not limited to such an architecture, and could equally well find application in a distributed, or peer-to-peer, architecture system, for example. The various marketplace, search, and payment applications 120, 121, and 122 could also be implemented as standalone software programs, which do not necessarily have networking capabilities.

The web client 106 accesses the various marketplace, search, and payment applications 120, 121, and 122 via the web interface supported by the web server 116. Similarly, the programmatic client 108 accesses the various services and functions provided by the marketplace, search, and payment applications 120, 121, and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102. As another example, the programmatic client 108 may be a search application to enable users to search for items. The items searched for may be informational items (e.g., news articles, blogs, images, multimedia content, etc.), transactional items (e.g., items for sale online, items for sale in brick-and-mortar locations, items wanted online, items wanted in brick-and-mortar locations), or other types of items.

The client machine 110 or 112 may present information to a user. For example, the client machine 110 may be running a web browser presenting a web page. The user may indicate a search query to the client machine 110. A search query defines the parameters of a search. A search query may include an alphanumeric string, an image, audiovisual data, or any suitable combination thereof. A search query may include filters that exclude results complying with or not complying with the filter. A search query may be composed of multiple elements. An element is a discrete portion of a search query, such as a word or phrase in an alphanumeric string, an image, or a filter. For example, the user may type a search query into a text field, select an item to search for similar or related items, upload an image to search for similar or related items, or any suitable combination thereof. One item is similar to another if they are substitutes for each other. For example, one television may be similar to another television. An item is related to another if they work together or are frequently purchased together. For example, peanut butter may be related to jelly, or a universal remote control may be related to a television.

The client machine 110 or 112 may submit the search query to an application server 118 running a search application 121. For example, the user may enter a search string into an HTML form and press a button to cause the submission of the search query to an application server. The search query may be transmitted using HTTP over TCP/IP.

The application server 118 may send the results of the search query back to the client machine 110 or 112. The application server 118 may also identify one or more related promotions. The related promotions may be promotions associated with the results of the search query. The application server 118 may send the search results and the selected promotions to the client machine 110 or 112.

The client machine 110 or 112 may present the search results received from the application server 118 to the user. The client machine 110 or 112 may also present one or more of the selected promotions to the user.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, search, or payment functions that are supported by the relevant applications of the networked system 102.

Figure 2:
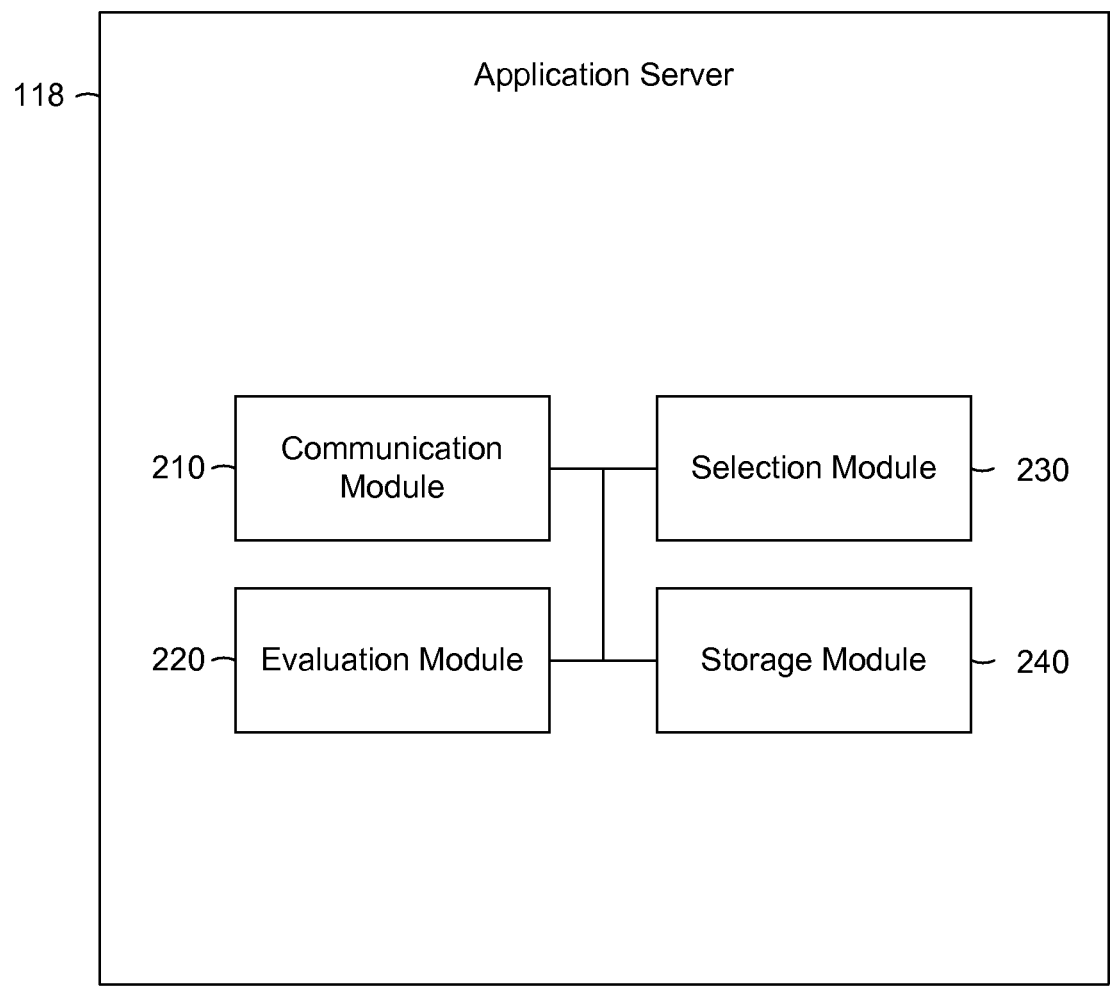
FIG. 2 is a block diagram illustrating components of an application server, according to some example embodiments, suitable for contextual promotions.

FIG. 2 is a block diagram illustrating components of an application server 118 running a search application 121, according to some example embodiments. The application server 118 is shown as including a communication module 210, an evaluation module 220, a selection module 230, and a storage module 240, all configured to communicate with each other (e.g., via a bus, shared memory, a switch, or application programming interfaces (APIs)). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 210 may control communication with the client machine 110 and the database 126. The communication module 210 may also send data for storage on the application server 118 or the database 126.

The communication module 210 may receive a search query from the client machine 110 or 112. Upon receiving a search query, the communication module 210 may send the search query to the evaluation module 220 to generate a set of results.

The evaluation module 220 may access a database (e.g., database 126) to identify search results responsive to the search query. For example, the search query received may be a query for items matching a search string. The search results generated may be items having one or more elements of the search string in the title of the item, in the body of the item, or in metadata about the item.

The selection module 230 may select one or more promotions based on the result set for the search query received from the client machine 110 or 112. For example, each of the results in the result set may be associated with zero or more promotions. The promotion having the most associated items in the result set may be the first-ranked promotion. The promotion having the second most associated items in the result set may be the second-ranked promotion, and so on. A number n of promotions to present may be determined. The n top-ranked promotions may be selected for presentation by the selection module 230.

The communication module 210 may send the results provided by the evaluation module 220 to the client machine 110 or 112, for display to the user. Additionally, the communication module 210 may send the promotions selected by the selection module 230 to the client machine 110 or 112, for display to the user.

Figure 3:
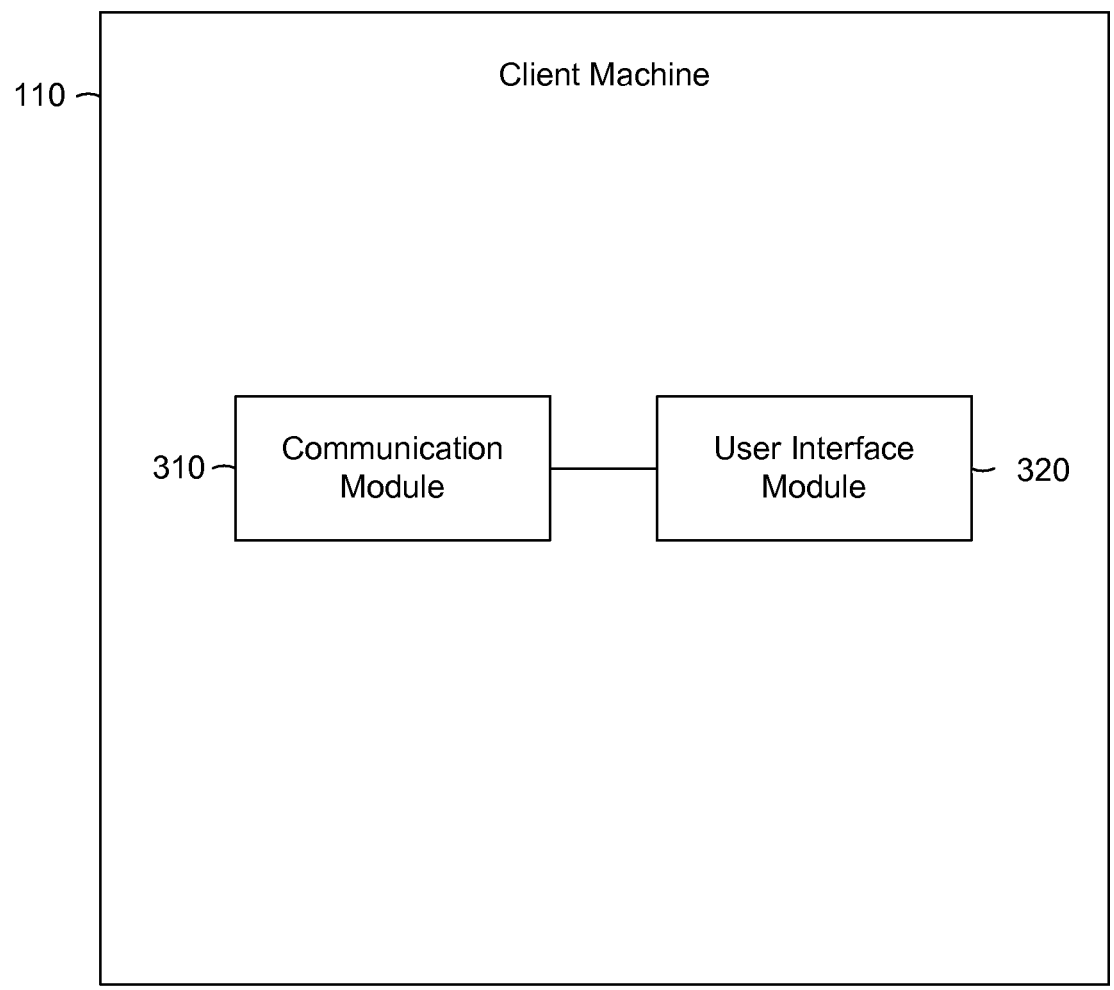
FIG. 3 is a block diagram illustrating components of a client machine, according to some example embodiments, suitable for contextual promotions.

FIG. 3 is a block diagram illustrating components of a client machine suitable for contextual promotions, according to some example embodiments. The client machine 110 or 112 is shown as including a communication module 310 and a user interface module 320, configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The communication module 310 may communicate with the application server 118, the network 104, or any suitable combination thereof. Information received via the communication module 310 may be presented (e.g., displayed on a display device) via the user interface module 320. For example, the user interface module 320 may implement a web browser running on a general-purpose processor causing the display of information on a display device, such as a monitor. Information may be selected or search queries may be entered by a user using a user interface presented by the user interface module 320, using an input device such as a keyboard, mouse, or touch screen. The search queries may be communicated to the application server 118 via the communication module 310. The communication module 310 may receive a response from the application server 118 that includes a set of results and a set of promotions, in any combination. Search results generated by the application server 118 may be received by the communication module 310 and presented to the user by the user interface module 320. For example, the search results may be presented in a list view or a gallery view.

In some example embodiments, the application server 118 provides a larger number of promotions than the user interface module 320 is configured to display. For example, the application server 118 may select five promotions, while the user interface module 320 may be configured to display no more than three recommendations. In these embodiments, the user interface module 320 may select the desired number of recommendations from the recommendations provided by the application server 118. For example, the five promotions may be ranked and the user interface module 320 may select the three highest-ranked promotions for presentation.

A successful session may be a session in which a user interacts with an item in any way (e.g., views the item, bids on the item, buys the item, subscribes to the item, etc.) or a session in which a particular interaction is performed (e.g., bids on the item, buys the item, or both). An unsuccessful session may be any session that is not successful. Other criteria may also be used to identify successful and unsuccessful sessions.

Figure 4:
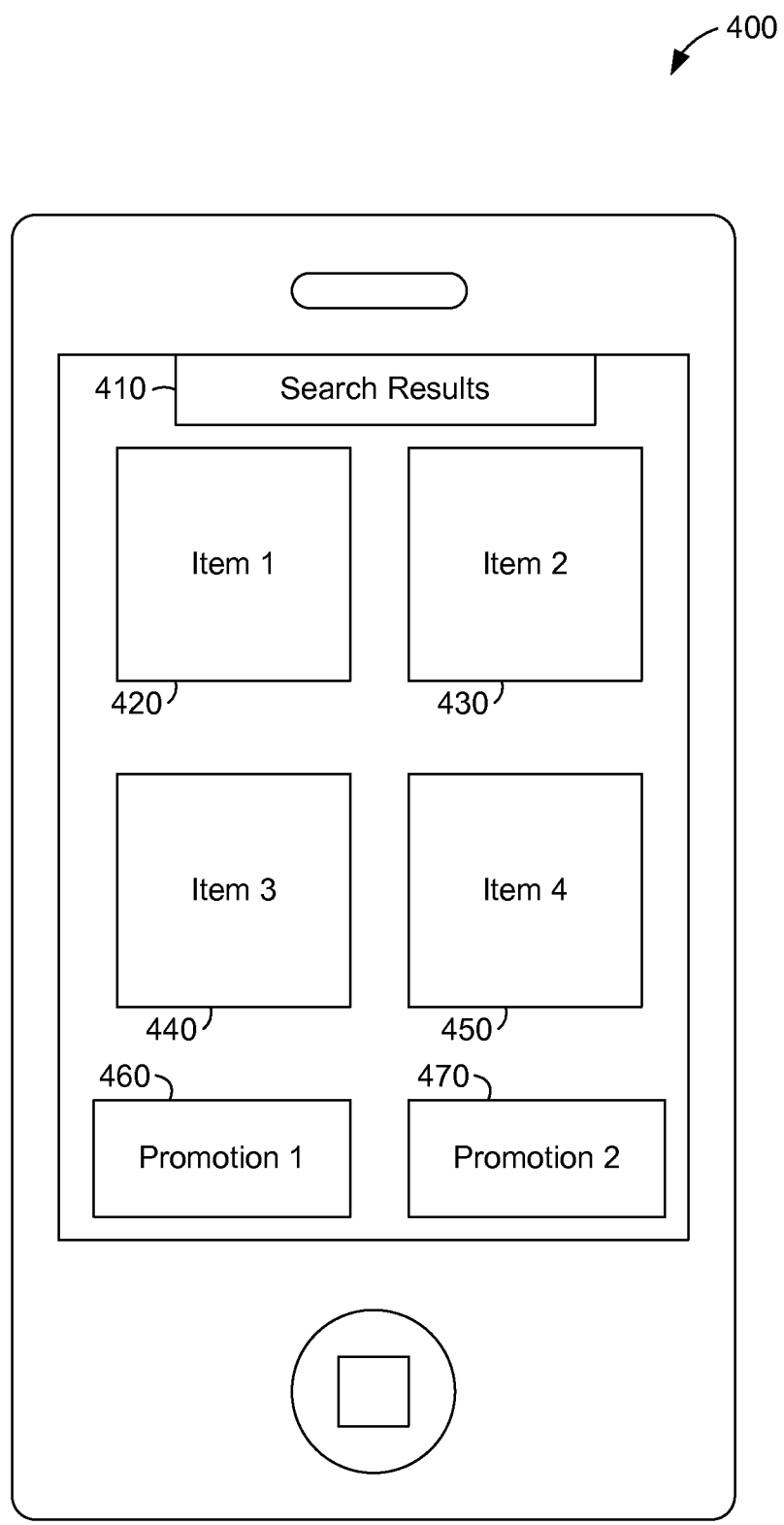
FIG. 4 is a block diagram illustrating a user interface, according to some example embodiments, suitable for presenting contextual promotions.

FIG. 4 is a block diagram illustrating a user interface 400 suitable for contextual promotions, according to some example embodiments. As can be seen in the block diagram of FIG. 4, the user interface 400 includes title 410, search results 420-450, and contextual promotions 460 and 470.

Each search result 420-450 may be operable to view additional information about the search result. For example, a search result may be an item for sale and the initial search result screen may show an image of the item and a label. Clicking on the image of the item may result in a new page being displayed that shows additional information about the item, such as an item description, additional images, a price, and so on. The results 420-450 may include items, events, locations, people, and so on. Items may be items for sale or items that are wanted for purchase. Events may be concerts, festivals, movies, sporting events, and the like. Locations may be monuments, stores, gas stations, restaurants, stadiums, and the like. People may be friends of the user, celebrities, or other people. In some example embodiments, one or more of the items, events, locations, or people displayed is chosen based on an advertising fee paid.

As shown in FIG. 4, the contextual promotions 460 and 470 are shown at the same time as the search results 420-450, but are not themselves search results. The contextual promotions 460 and 470 are not determined directly in response to the search query, and are not simply item details of the search results 420-450. Instead, the contextual promotions 460 and 470 contain additional information regarding their respective promotions. The contextual promotions 460 and 470 may include buttons that are operable to submit the contextual promotions. The contextual promotions 460 and 470 may include images or text presenting information about the contextual promotions. For example, an image of an item involved in the promotion may be presented, a name of the promotion may be presented, a time remaining for the promotion may be presented, and so on. When information about an item is presented, that information may include an image of the item, a price of the item, a brand of the item, an aspect of the listing for the item, a name of a seller of the item, and so on. The price of the item may be a promotional price (e.g., a reduced price) for the item, a non-promotional price for the item, or both. When multiple prices for the item are displayed, the promotional price may be highlighted (e.g., displayed in a larger font, in a different color, using underlining, using bold, and so on). Similarly, the original price may be diminished (e.g., displayed in a smaller font, in a different color, using strikethrough, and so on). After a contextual promotion 460 or 470 is selected, the corresponding promotion may be selected and an updated user interface 400 presented. The updated user interface 400 may include new search results 420-450 related to the selected promotion and/or new contextual promotions 460 and 470.

FIG. 5 shows two sample user interfaces for presenting contextual promotions. The UI 510 shows three items for sale. Each item is a pair of headphones, and is part of a headphone promotion. Information for each item includes an image, a name, and a price. Additionally, two of the items show an original price and a discount percentage. The image or text associated with an item may be operable by a user to show a detail page for the item. For example, the user may click on an image of a pair of headphones and be presented with the item listing page for that pair of headphones. With respect to FIG. 4, the UI 510 may be displayed in place of the contextual promotions 460 and 470. The UI 510 contains promotional items associated with a headphone promotion, and would be displayed in addition to the results directly responsive to the search query.

The UI 520 shows five images associated with a sale event titled "Prepare for Winter." The type of event is shown as "Sale Event." The title of the sale event is shown along with an image associated with the event and information about the event: "Up to 40% Off. Free shipping." Images of four items associated with the event are also shown. The UI 520 may be operable to bring up a page for the sale event. For example, the UI 520 may be displayed at the bottom of a page of results for a search query. By clicking anywhere in the "Sale Event" portion of the screen, the user may be taken to a page for the promotion showing information about items in the promotion. Additionally or alternatively, the images of the four items associated with the event may be operable to take the user to a listing for the corresponding item. For example, clicking on the "Winter Prep" image may take the user to a page for the promotion, while clicking on the first image of an item may take the user to a page for that item. As with the UI 510, the UI 520 may be displayed in place of the contextual promotions 460 and 470 of FIG. 4. The UI 520 contains promotional items associated with a sale event promotion, and would be displayed in addition to the results directly responsive to the search query.

Figure 6:
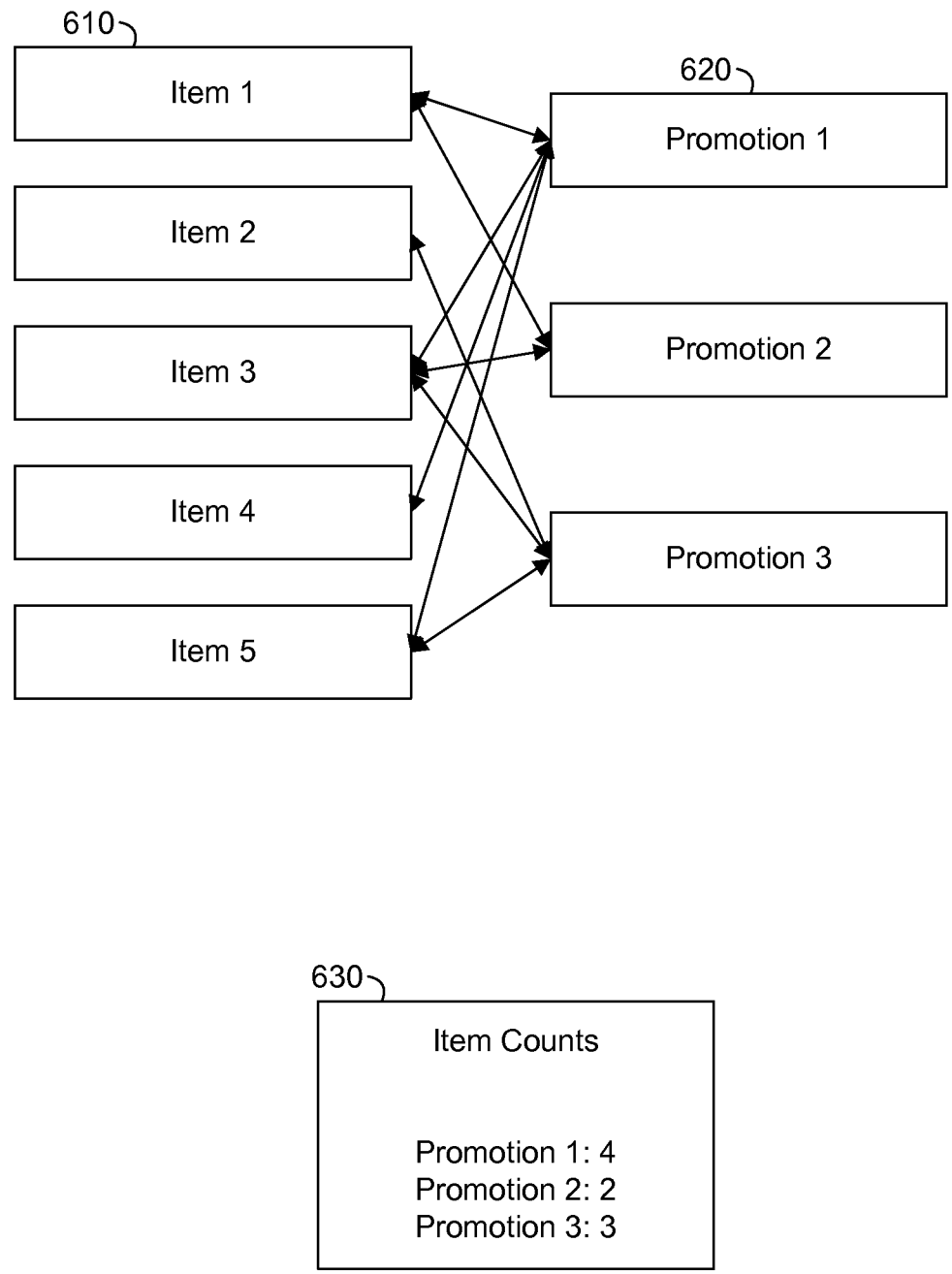
FIG. 6 is a block diagram illustrating data structures, according to some example embodiments, suitable for selecting contextual promotions.

FIG. 6 is a block diagram illustrating data structures, according to some example embodiments, suitable for selecting contextual promotions. Each of the five data elements 610 stores data for an item in a database. Each of the three data elements 620 stores data for a promotion in a database. The data elements 610 and the data elements 620 may be stored in the same database or in different databases. Arrows connecting the data elements 610 and 620 show associations between items and promotions. For example, Item 1 is associated with Promotion 1 and Promotion 2. Table 630 shows the number of items (data elements 610) associated with each of the three promotions (data elements 620). For example, table 630 shows four items being associated with Promotion 1, two items being associated with Promotion 2, and three items being associated with Promotion 3. Data elements 610 may be items responsive to a query submitted by a user. In some example embodiments, promotions are selected for presentation based on the item counts in table 630. For example, Promotion 1 may be selected for display with the result set based on Promotion 1 having more associated items than Promotion 2 or Promotion 3.

Figure 7:
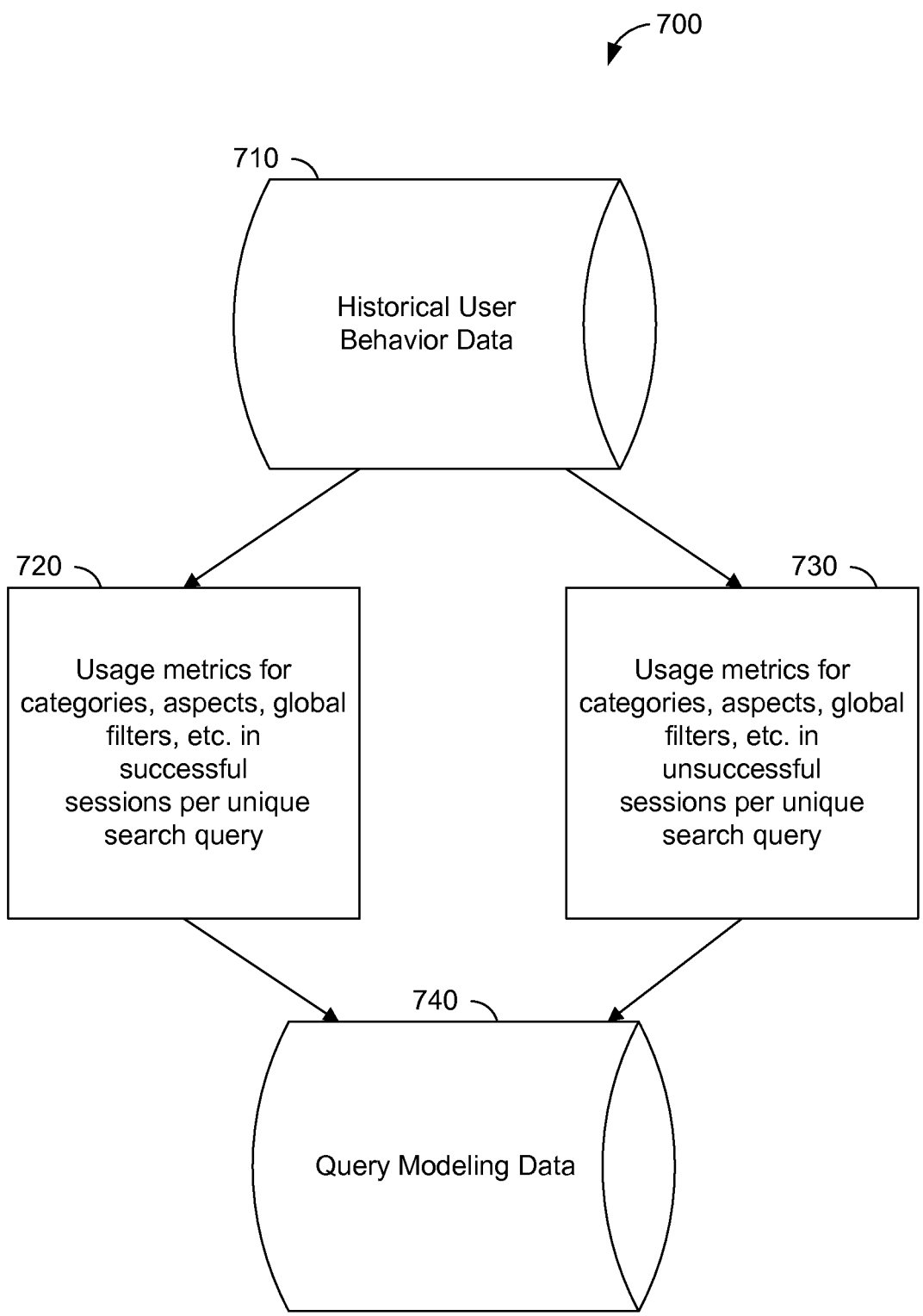
FIG. 7 is a block diagram illustrating the use of query data features, according to some example embodiments, in performing a method of selecting contextual promotions.

FIG. 7 is a block diagram 700 illustrating the use of query data features in performing a method of selecting contextual promotions, according to some example embodiments. A database 710 stores historical user behavior data with data regarding the behavior of a number of users of the system. In one embodiment, data regarding the actions of all users are stored in the database 710.

From the historical user behavior data, usage metrics 720 for categories, aspects, global filters, and the like in successful sessions for each unique search query may be extracted. For example, if each item is associated with one or more categories, the percentage of items purchased associated with each category after a particular search query can be determined from the historical user behavior data. When a category criterion is met, an association between the query and the category can be formed. Example category criteria include: the total number of purchased items in the category exceeding a threshold, the percentage of items purchased in the category exceeding a threshold, the rank of the number of purchased items in the category exceeding a threshold, or any suitable combination thereof. As another example, for each purchase of an item after use of a particular query, a determination can be made from the historical user behavior data as to whether any global filters were used in that session and which filters were used. When a global filter criterion is met, an association between the query and the global filter can be formed. Example global filter criteria include: the total number of purchased items following use of the filter, the percentage of purchased items following use of the filter, the rank of the use of the filter among available filters, or any suitable combination thereof.

Similarly, usage metrics 730 for categories, aspects, global filters, and the like in unsuccessful sessions for each unique search query may be extracted. For example, the category for each item viewed during unsuccessful sessions including a query can be stored in the historical user behavior data. Based on an unsuccessful category criterion being met, a negative association between the category and the query can be formed for each unique search query. Example unsuccessful category criteria include: the total number of unsuccessful sessions including viewing items from the category exceeding a threshold, the percentage of unsuccessful sessions including viewing items from the category exceeding a threshold, the rank of the number of unsuccessful sessions including viewing items from the category exceeding a threshold, or any suitable combination thereof. These positive and negative associations between queries and the categories, aspects, and global filters are stored in the database 740 as query modeling data.

Figure 8:
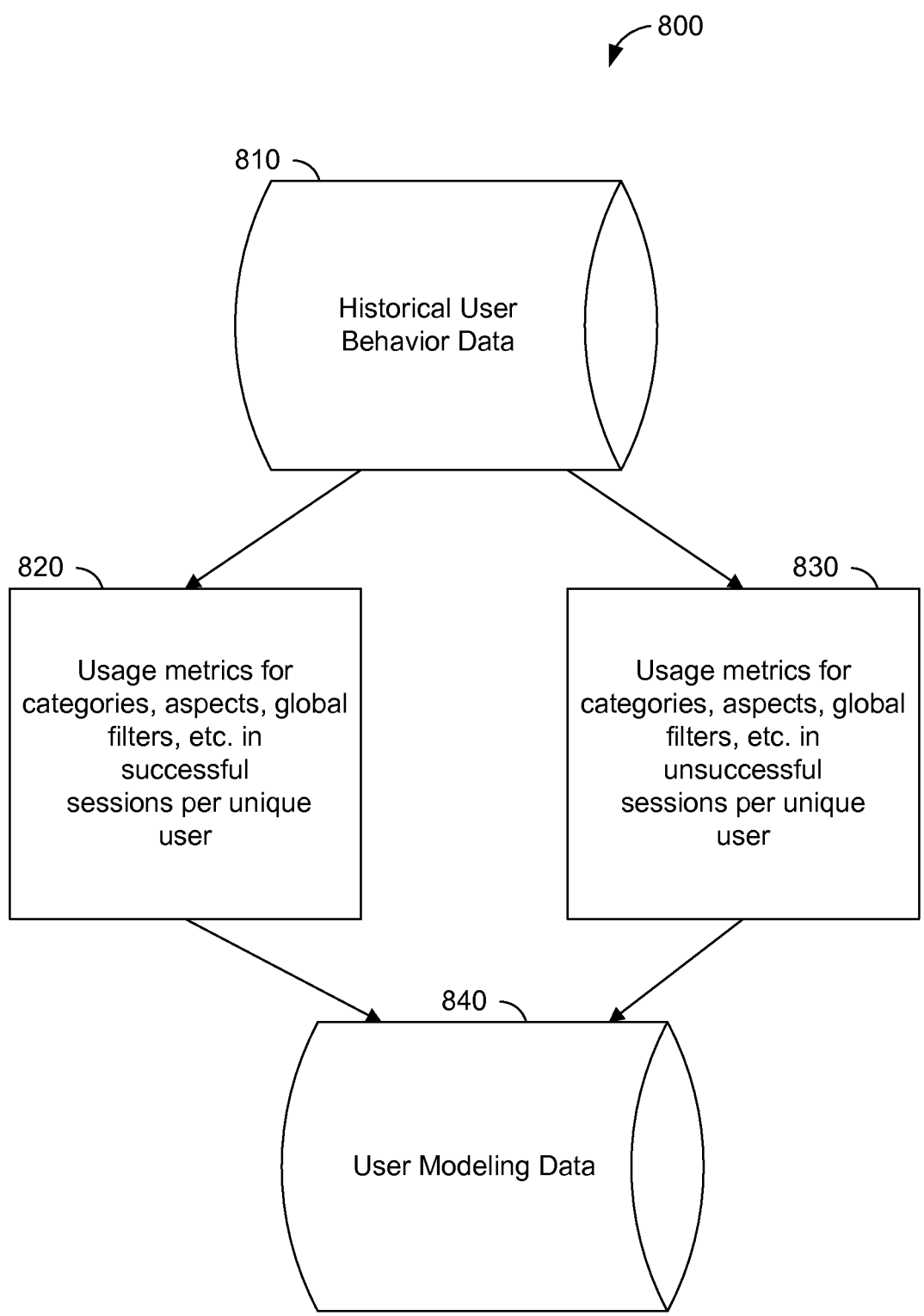
FIG. 8 is a block diagram illustrating the use of user data features, according to some example embodiments, in performing a method of selecting contextual promotions.

FIG. 8 is a block diagram 800 illustrating the use of user data features in performing a method of selecting contextual promotions, according to some example embodiments. A database 810 stores historical user behavior data with data regarding the behavior of a number of users of the system. In one embodiment, data regarding the actions of all users are stored in the database 810. In some example embodiments, the database 810 and the database 710 are the same database.

From the historical user behavior data, usage metrics 820 for categories, aspects, global filters, and the like in successful sessions for each unique user be extracted. For example, if each item is associated with one or more categories, the percentage of items purchased associated with each category for a particular user can be determined from the historical user behavior data. When a category criterion is met, an association between the user and the category can be formed. Example category criteria include: the total number of purchased items in the category exceeding a threshold, the percentage of items purchased in the category exceeding a threshold, the rank of the number of purchased items in the category exceeding a threshold, or any suitable combination thereof. As another example, for each purchase of an item by a user, a determination can be made from the historical user behavior data as to whether any global filters were used in that session and which filters were used. When a global filter criterion is met, an association between the query and the global filter can be formed. Example global filter criteria include: the total number of purchased items following use of the filter, the percentage of purchased items following use of the filter, the rank of the use of the filter among available filters, or any suitable combination thereof.

Similarly, usage metrics 830 for categories, aspects, global filters, and the like in unsuccessful sessions for each unique user may be extracted. For example, the category for each item viewed during unsuccessful sessions of a user can be stored in the historical user behavior data. Based on an unsuccessful category criterion being met, a negative association between the category and the user can be formed for each unique search query. Example unsuccessful category criteria include: the total number of unsuccessful sessions including viewing items from the category exceeding a threshold, the percentage of unsuccessful sessions including viewing items from the category exceeding a threshold, the rank of the number of unsuccessful sessions including viewing items from the category exceeding a threshold, or any suitable combination thereof. These positive and negative associations between users and the categories, aspects, and global filters are stored in the database 840 as user modeling data.

Figure 9:
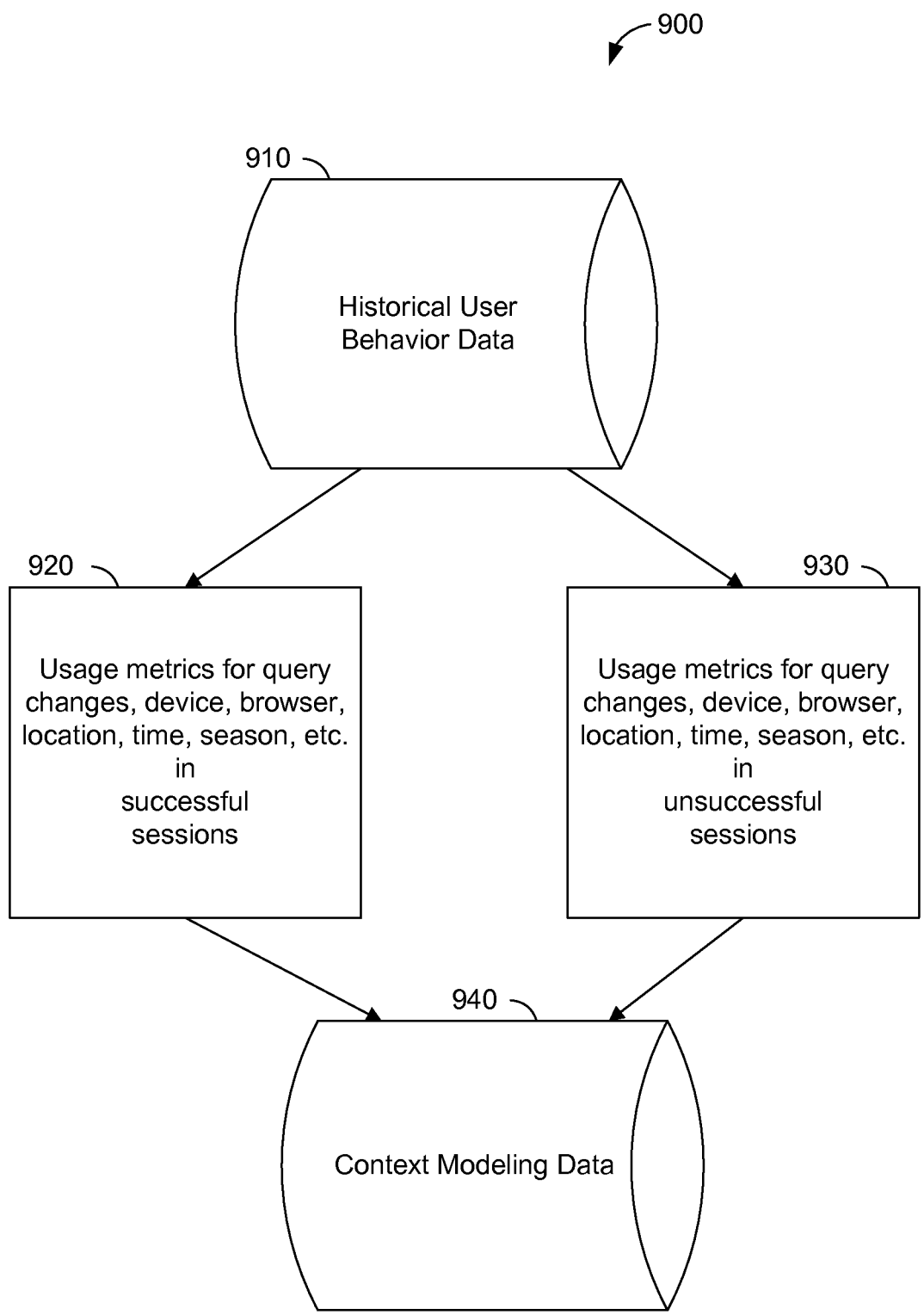
FIG. 9 is a block diagram illustrating the use of context data features, according to some example embodiments, in performing a method of selecting contextual promotions.

FIG. 9 is a block diagram 900 illustrating the use of context data features in performing a method of selecting contextual promotions, according to some example embodiments. A database 910 stores historical user behavior data. In some example embodiments, the databases 710, 810, and 910 are a single database. From the historical user behavior data, usage metrics 920 for query changes, device, browser, location, time, season, and the like in successful sessions may be extracted. For example, when a device criterion is met, an association between the device and success may be made. Example device criteria include the total number of purchased items using the device exceeding a threshold, the percentage of items purchased using the device exceeding a threshold, the rank of the number of purchased items using the device exceeding a threshold, or any suitable combination thereof. For example, if the device used for most purchases is an iPad, a positive association between iPads and sessions can be made. Similarly, usage metrics 930 for query changes, device, browser, location, time, season, and the like in unsuccessful sessions may be extracted. The usage metrics 920 and 930 may be used to model the promotions that may be desirable in future queries in similar contexts and stored in the database 940 as context modeling data. For example, based on historical context data, a search for jackets during the summer may often be followed by a related search for windbreakers, while a search for jackets during the winter may often be followed by a related search for coats. Thus, the query modeling data would suggest both coats and windbreakers as related searches, but the context modeling data would suggest an appropriate related search based on the season. Based on the appropriate related search, items displayed for a promotion may be selected. For example, a promotion for a brand of clothing may present coats of that brand during the winter and windbreakers of that brand during the summer.

Figure 10:
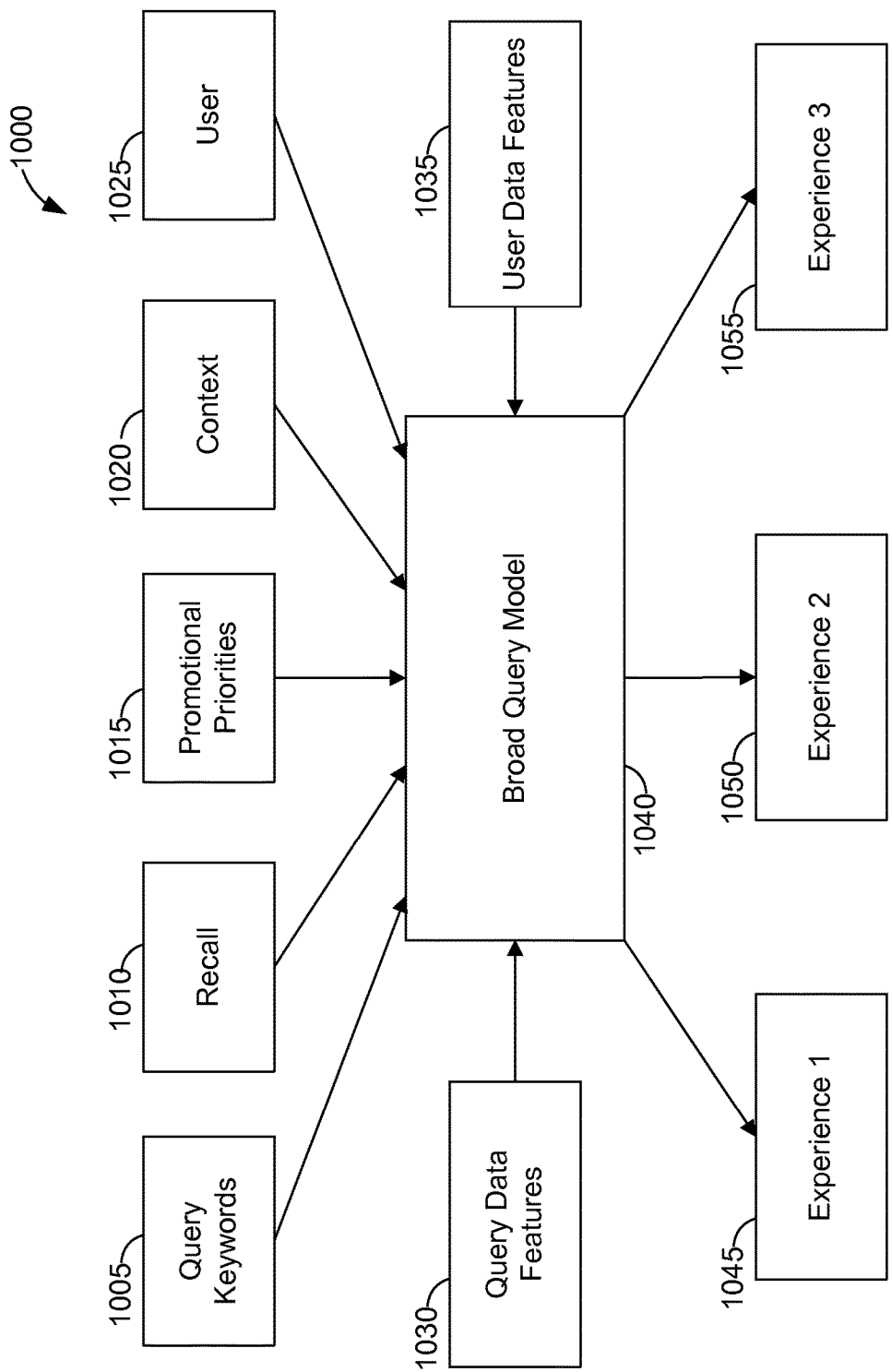
FIG. 10 is a block diagram illustrating factors suitable for selecting contextual promotions, according to some example embodiments.

FIG. 10 is a block diagram 1000 illustrating factors suitable for contextual promotions, according to some example embodiments. As shown in the block diagram 1000, the query keywords 1005, recall 1010, promotional priorities 1015, context 1020, user 1025, query data features 1030, and user data features 1035 may be inputs into the broad query model 1040. The broad query model 1040 may generate one or more experiences 1045-1055. Each experience is an option to be presented to a user, operable to cause the presentation of information related to the experience to the user.

The query keywords 1005 may be part of a search query submitted by the user. For example, a search query may be composed of a selected image and a plurality of keywords.

The recall 1010 may include the result set generated for the user in response to the search query. Continuing with the example of a search query composed of an image and a plurality of keywords, the result set may include images similar to the selected image, articles containing one or more of the plurality of keywords, articles including the selected image, articles including images similar to the selected image, images with titles or metadata including one or more of the plurality of keywords, or results that are found to be relevant to the search in another way. Items in the recall 1010 may be associated with promotions.

The promotional priorities 1015 include weights for the promotions that may be presented. For example, if every promotion has the same weight, the promotional priorities 1015 will have no impact. As another example, a seller may pay a fee on a per-impression or per-click basis for a promotion. Based on this fee, a priority may be assigned to the seller's promotion. A seller paying a higher fee may have a higher priority than another seller paying a lower fee or no fee. The weight for a promotion may be combined in a multiplicative or additive fashion with the other inputs used by the broad query model 1040 to determine the selected promotions. For example, a promotion with a weight of two may be treated as though it had twice as many associated items in the recall 1010. In some example embodiments, competing promotions are prevented from being displayed at the same time. For example, two different sellers may have promotions including the same items. Based on the exclusive nature of the two promotions, when one is selected for display, the other may be excluded. Integrating this with the promotion with a weight of two in the example discussed above, the higher-weighted promotion may be displayed, and the lower-weighted promotion excluded, even when the higher-weighted promotion has fewer items in the recall 1010.

The context 1020 may encompass any information about the circumstances under which the query is submitted. For example, the context may include not only the search query and the user, but the browser being used, the time of day the query is submitted, which queries were submitted before the current query, and any other information about the circumstances under which the query is submitted. For example, the query may be submitted from a known location (e.g., a location determined by a GPS device in the client machine 110 or 112, a location determined based on the user's IP address, a location determined by a user setting, or otherwise determined). Based on the known location, promotions for sellers or events near the location may be selected. For example, if a user is walking in an area having a Target nearby but not having a Wal-Mart, and promotions for both Wal-Mart and Target are available, the Target promotion may be selected over the Wal-Mart promotion based on the location of the user and the location of the store. A maximum distance may be specified as part of the data regarding the promotion, as part of the data regarding the user, be based on the user's location, or be a system-wide constant. For example, the maximum distance for the promotion may be one mile, and the promotion may be excluded from presentation if no associated store is within a mile of the querying user.

The user 1025 can include information about the user submitting the query. For example, the user's name, age, address, gender, income level, education level, marital status, and any other information known about the user.

In some example embodiments, the query keywords 1005, recall 1010, promotional priorities 1015, and user 1025 are accessed by the broad query model 1040 before information regarding the context 1020, the query data features 1030 and the user data features 1035 is accessed. An initial set of relevant promotions may be identified based on the query keywords 1005, recall 1010, promotional priorities 1015, and user 1025 and then refined based on the context 1020, the query data features 1030, and the user data features 1035. In other example embodiments, input data elements are accessed by the broad query model 1040 in a different order.

The query data features 1030 include information based on the query. For example, a promotion commonly selected by other users (or all users including the current user) after running the current search query would be a query data feature 1030. To illustrate, a selection of a "Nikon" promotion may frequently follow searches for "camera." Accordingly, the "Nikon" promotion may be a query data feature for the "camera" query. Another query data feature is data regarding the position of the results. For example, the position of a promotion may be determined based on the probability of interaction with the results in the result set. If a promotion in the fifth position is often skipped over by users in favor of the result in the sixth position in the result set for a particular query, then the position of the promotion may be demoted to the sixth position and the more-favored result moved above it.

The user data features 1035 include information based on the user. For example, a promotion commonly selected by the current user after other queries may be a user data feature 1035. To illustrate, the current user may frequently select a "Free Shipping" promotion after previous queries. Accordingly, the "Free Shipping" promotion may be a user data feature 1035 for the user. As another user data feature, the propensity of the user for interacting with promotions may be considered. For example, a user with an above-average likelihood to interact with promotions may be shown more promotions than an average user. Conversely, a user that never interacts with promotions may have the promotions hidden automatically.

After considering the query data features 1030 and the user data features 1035 for the input query (including the query keywords 1005), recall 1010, promotional priorities 1015, context 1020, and user 1025, the broad query model 1040 may generate one or more experiences 1045-1055. Each experience 1045-1055 may be a promotion. For example, the broad query model 1040 may apply various weights to queries generated using the inputs 1005-1035 to generate the experiences 1045-1055. Based on the recall 1010, a promotion for camera accessories may be selected. Based on the query data features 1030, a promotion for "Nikon" may be selected. Based on the user data features 1035, a promotion "Free Shipping" may be generated. Based on weighting factors or recommendation hierarchy, the recommendation based on the user data features 1035 may be presented in the first position as the experience 1045. Based on the weighting factors or recommendation hierarchy, the recommendation based on the query data features 1030 may be presented in the second position as the experience 1050. In other embodiments, different combinations of recommendations, weighting factors, hierarchies, and numbers and positions of results may be used. Some example embodiments of weighting factors are discussed below, with respect to the promotion selection table 1190 of FIG. 11.

In some example embodiments, promotions may be prioritized based on the number of eligible items in the result set associated with each promotion, a relative priority between the promotions, or both. For example, if a first promotion has ten items associated with it in the result set and a second promotion has five items associated with it in the result set, the first promotion can be selected for presentation based on the higher number of associated items in the result set. As another example, a search for "bag" may return results associated with a Coach event and a back-to-school event. The Coach event may have a higher priority than the back-to-school event, and be chosen for presentation to the user based on the higher priority. The priorities may be set by an administrator and stored in a database.

The generated experiences for each keyword may be stored for later access (e.g., in a database) or generated dynamically each time a query is received. In embodiments in which the generated experiences are stored for later access, the generated experiences may be periodically updated based on the additional data gathered for the query and the user in the time elapsed since the previous generation of experiences. For example, experiences may be generated and stored for high-frequency keywords and updated on a weekly basis. A high-frequency keyword is a keyword that is searched for more than a minimum threshold of times in a period. For example, a high-frequency keyword may be a keyword that is searched in at least 1000 sessions per month. As another example, the threshold may be determined based on targeting a certain number of high-frequency keywords. For example, the threshold may be set so that the most-frequently-searched 60,000 keywords are considered to be high-frequency keywords.

A number of data fields regarding a promotion may be stored and transmitted to the client machine 110 or 112. For example, each of the following may be stored for a recommended promotion: the total number of uses of the promotion ("total_imp"), the percentage of the time that successes resulted from the use of this promotion ("ctr"), the number of buy-it-now events that resulted from the use of this promotion ("bin"), the number of successes with this promotion ("clicks"), the number of uses of this promotion ("imp"), the identifier of the promotion ("appliedPromotion"), and a uniform resource locator ("URL") for an image for the promotion ("url". The decision about which promotions to recommend may be based on thresholds corresponding to any of these values. For example, a promotion with total_imp>1000 and ctr<5% may no longer be selected due to a perceived low likelihood of selection. As another example, a promotion with ctr>10% may be selected based on a high click-through rate.

The click-through-rate of the promotion may also be compared to the click-through-rate of the results, and the position of the promotion determined based on the comparisons. For example, if the ctr of the promotion is higher than the ctr of the first result, the promotion may be presented before the first result. If the ctr of the promotion is higher than the ctr of the second result but lower than the ctr of the first result, the promotion may be presented after the first result and before the second result. By repeating this process, the promotion may be placed in a position based on its ctr.

The image for a promotion may be selected manually or automatically. An image for a promotion may be automatically selected from items in that promotion by using criteria such as click-through-rate to select the image for an item that is often viewed, the popularity of an item that is often purchased, or the contrast, brightness, background color (e.g., white), and temperature of the image to select an image that is more likely to contain an easily-recognizable object. Images may be periodically updated. For example, an automatically-selected promotion image may be re-selected on a weekly or monthly basis from currently-available items.

Information about the recommended promotions may be transferred from the application server to the client machine 110 or 112 via javascript object notation ("JSON") data objects or any other data format.

FIG. 11 is a block diagram illustrating a database schema 1100 suitable for providing contextual promotions, according to some example embodiments. Shown in the database schema 1100 are the fields for an item table 1110, a query table 1120, a context table 1130, a query keywords table 1140, an item promotions table 1150, a promotion table 1160, a promotion history table 1170, a session table 1180, and a promotion selection table 1190. In various embodiments, fewer or additional tables are used. Furthermore, in different embodiments, fewer or additional fields may be used in each table. For example, values that are stored in fields in the database schema 1100 may be unnecessary in certain embodiments, inferred by software in certain embodiments, and stored in other tables in certain embodiments. Accordingly, the database schema 1100 is provided by way of example and not limitation.

The item table 1110 contains one row for each item available as a response to the user's query. As shown in the database schema 1100, each item has an item identifier, a name, a description, a category, and a price. Additional information for each item (e.g., a URL and an image) may also be stored. The item identifier may serve to uniquely identify each item within the database. The remaining fields in the item table 1110 may serve to describe the item.

The query table 1120 contains one row for each query submitted to the system. In some example embodiments, queries are archived or deleted periodically (e.g., monthly) or after the elapse of a predetermined period of time (e.g., a month after the query is received). As shown in the database schema 1100, each query has a query identifier, a user identifier, a context identifier, and a session identifier. The query identifier may serve to uniquely identify each query within the database. The user identifier may serve to identify the user that submitted the query. The context identifier may serve as an index into the context table 1130, containing information regarding the context in which the query was submitted. The session identifier may serve as an index into the session table 1180, and link a set of related queries into a session.

The context table 1130 contains one row for each unique context of queries submitted to the system. Each row in the context table 1130 includes a context identifier, a timestamp, a browser identifier, a device identifier, and a location identifier. The information in the context table 1130 reflects the time, browser, device, and location from which the query was submitted. In some example embodiments, data shown in the database schema 1100 in the context table 1130 is stored directly in the query table 1120.

The query keywords table 1140 contains one row for each keyword in each query. For example, a query submitted for "fast cars" may have two rows in the query keywords table 1140. The two rows would have the same query identifier. One of the two rows would have a keyword value "fast" and the other would have a keyword value "cars." In this way, multiple keywords can be associated with a single query. In alternative embodiments, the query keywords may be stored as a string directly in the query table 1120.

The item promotions table 1150 contains one row for each promotion associated with each item. For example, a Brand X winter coat may be associated with a Brand X promotion and a winter promotion. Accordingly, the item identifier for the Brand X winter coat would be associated with the Brand X promotion in a first row of the item promotions table 1150 and associated with the winter promotion in a second row of the item promotions table 1150.

The promotion table 1160 contains one row for each promotion in the system. Each row of the promotion table 1160 contains a promotion identifier, a name, a category, a number of successes for the promotion, a success rate for the promotion, and a weight. In some example embodiments, additional information for the promotion is stored in the promotion table 1160. For example, the promotion may be associated with an image or a discount code, and the image, the location of the image, the discount code, or any suitable combination thereof may be stored in the promotion table 1160. The weight may be used when selecting promotions for presentation, as discussed in more detail with respect to the promotion selection table 1190 below.

The promotion history table 1170 maintains a record of which promotions were shown in response to which queries. Each row indicates the promotion identifier of the displayed promotion and the query identifier of the query that caused the promotion to be displayed. In some example embodiments, additional data is stored in the promotion history table 1170. For example, a field may be added to indicate whether that particular display of the promotion resulted in a success or not.

The session table 1180 indicates, for each session, whether that session resulted in a success. Accordingly, as an example using pseudo-SQL, the session identifiers for successful sessions for a particular user can be retrieved from the database schema 1100 by: SELECT Session.SessionID from Session where Session.SuccessFlag=TRUE and Session.SessionID=Query.SessionID and Query.UserID=<ID for the particular User>.

The promotion selection table 1190 contains weights for the various selection criteria used to determine which promotions to present along with a set of search results. In some example embodiments, each promotion is assigned a score using the weights in the promotion selection table 1190 and the top scoring promotions are selected for presentation. For example, in FIG. 4, two promotions are presented. As another example, in FIG. 10, three promotions are presented. As shown, the promotion selection table 1190 includes weights for recall, query, user, promotion, and context. In various example embodiments, more or fewer weights are used. In some example embodiments, the weights in each row of the promotion selection table 1190 sum to 1. For example, the recall weight may be 0.3, the query and user weights may each be 0.2, and the context weight may be 0.3. The weights in the promotion selection table 1190 may be set by an administrator, dynamically altered in response to user behavior (e.g., through A/B testing), or any suitable combination thereof.

The recall weight of the promotion selection table 1190 is applied to promotions associated with items in the result set. For example, if three promotions are associated with items in the result set (via the item promotions table 1150), those promotions may be assigned the recall weight as an initial score. In some example embodiments, the number of items associated with the result set is used as a multiplier. Thus, if three items in the result set are associated with one promotion and one item is associated with a second promotion, the initial score for the first promotion may be set to three times the initial score of the second promotion. Other promotions, not associated with any items in the recall, would have an initial score of zero.

The query weight of the promotion selection table 1190 is applied to promotions associated with the query (e.g., via the promotion history table 1170). For example, promotions with above-average success rates when used with the query may have the query weight added to their score, promotions with below-average success rates when presented with the query may have the query weight subtracted from their score, or both.

The user weight of the promotion selection table 1190 is applied to promotions associated with the user (e.g., via the promotion history table 1170 and query table 1120). For example, promotions with above-average success rates when presented to the user may have the user weight added to their score, promotions with below-average success rates when presented to the user may have the user weight subtracted from their score, or both.

The context weight of the promotion table 1190 is applied to promotions associated with the context of the query (e.g., via the context table 1130, the query table 1120, and the promotion history table 1170). For example, promotions with above-average success rates when presented in the current context may have the context weight added to their score, promotions with below-average success rates when presented in the current context may have the context weight subtracted from their score, or both. In some example embodiments, the degree to which the context is associated with success or non-success of the promotion is used when determining the score. For example, a promotion having an average success rate in the context can be assigned a context score of 0, a promotion having a success rate in the context that is one standard deviation above the mean can be assigned a context score equal to the context weight, a promotion having a success rate in the context that is two standard deviations below the mean can be assigned a context score equal to the negative of double the context weight, and so on.

To illustrate, the table below of five promotions will be considered and scored. In this illustration, the recall and user weights are 0.3 and the query and context weights are 0.2. A positive score equal to the weight will be assigned when the promotion has a positive association with the respective feature. A zero score will be assigned when the promotion does not have a positive association with the respective feature. The promotion weight (from the promotion table 1160) is applied as a multiplier to the score generated using the weights in the promotion table 1190. A "+" indicates a positive association between the promotion and the recall, query, user, or context. A "−" indicates a negative association between the promotion and the recall, query, user, or context.

| Promotion | Recall | Query | User | Context | Promotion Weight | Score |
| --- | --- | --- | --- | --- | --- | --- |
| A | − | + | − | + | 1 | 0.4 |
| B | + | − | + | − | 2 | 1.2 |
| C | + | + | − | − | 0.5 | 0.25 |
| D | − | − | − | + | 1 | 0.2 |
| E | − | + | + | − | 1 | 0.5 |

In this illustration, promotion B has the highest score. Promotion B has a positive association with both the recall and the user, each of which is weighted at 0.3, giving a score of 0.6. Promotion B further has a promotion weight of 2, doubling the score to 1.2. By contrast, promotion D has the lowest score. Promotion D has a positive association only with the context, giving it an initial score of 0.2. Promotion D has a promotion weight of 1, leaving the score unchanged.

As described above, the promotion selection table 1190 contains a single row of weights. However, multiple rows in the promotion selection table 1190 may be used, with each row having different weights for use in different situations. For example, as discussed with respect to FIG. 10, a particular UI may have slots for multiple promotions, and each slot may be populated using different criteria. For example, a first slot may be preferentially populated with promotions based on query data features. To implement this, each row in the promotion selection table 1190 can include an identifier associated with the UI slot. The query weight for the first slot may be increased, to increase the weight of promotions positively associated with the query. In some example embodiments, the other weights are set to zero, to eliminate the influence of other factors on the promotion selection. Continuing with this example, the second slot may be preferentially populated with promotions based on user data features. The user weight in the row of the promotion selection table 1190 for the second slot may accordingly be increased. Likewise, the third slot may be preferentially populated with promotions based on recall, and the recall weight for the row of the promotion selection table 1190 for the third slot may be increased to reflect this preference.

Figure 12:
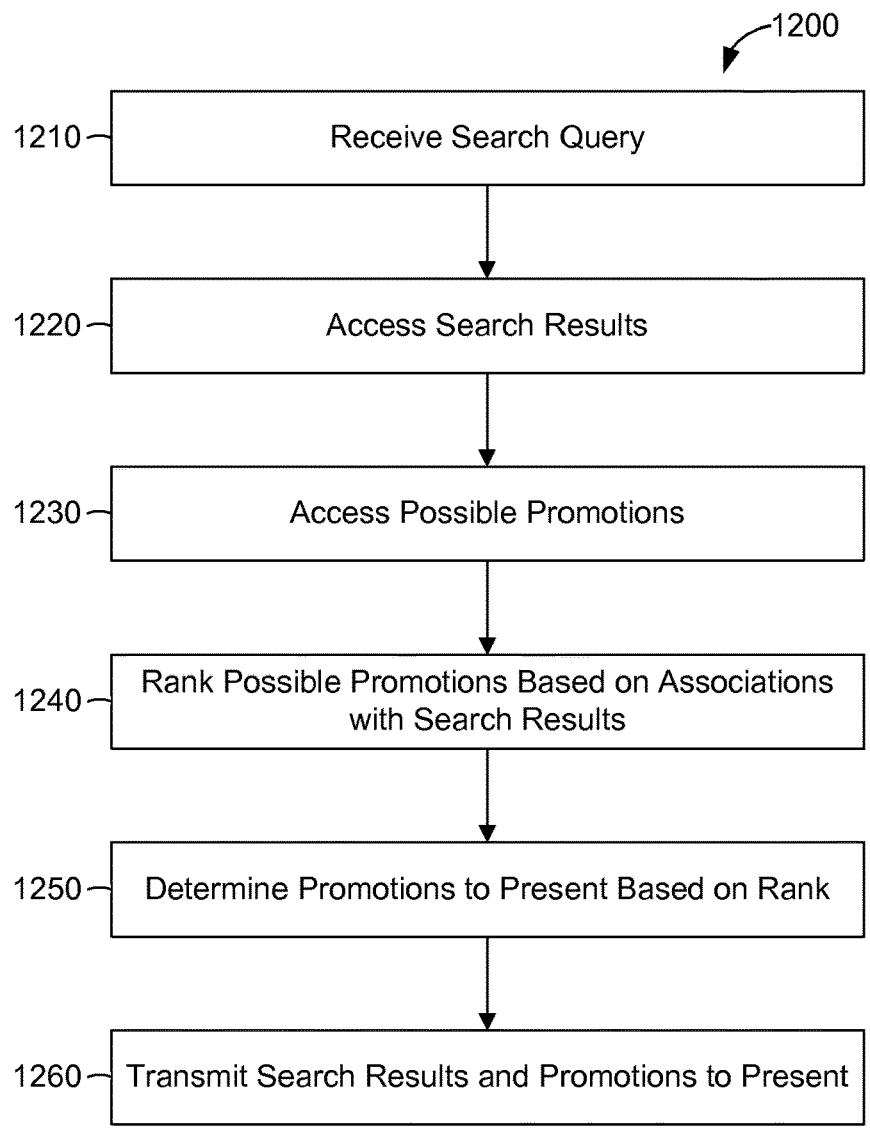
FIG. 12 is a flowchart illustrating operations of an application server, according to some example embodiments, in performing a method of selecting contextual promotions.

FIG. 12 is a flowchart illustrating operations of an application server 118 in performing a method 1200 of selecting contextual promotions, according to some example embodiments. Operations in the method 1200 may be performed by the application server 118, using modules described above with respect to FIG. 2. As shown in FIG. 12, the method 1200 includes operations 1210, 1220, 1230, 1240, 1250, and 1260.

In operation 1210, the communication module 210 of the application server 118 receives a search query. For example, the search query may be the keyword "dress."

In operation 1220, the evaluation module 220 identifies a result set based on the search query. For example, the evaluation module 220 may identify 500 items that contain the word "dress" in their titles or descriptions. These 500 items may comprise the result set for the query.

In operation 1230, the selection module 230 of the application server 118 accesses a set of available promotions. For example, a database containing promotions may be accessed to identify all promotions available in the system. As another example, promotions may be flagged (either automatically or by a curator) for use for a certain date range or as long as the flag remains set. In some example embodiments, the set of available promotions is identified by reference to the items in the result set. For example, database records may indicate which promotions each item is associated with. By adding the promotions associated with each item in the result set to a set of promotions, the set of promotions including or consisting of the promotions associated with the items in the result set can be generated.

In operation 1240, the selection module 230 of the application server 118 ranks the available promotions based on associations between the promotions and the search results. For example, the number of associations between each promotion in the set of available promotions and the items in the result set may be counted. Promotions with a higher count of associations may be ranked more highly than promotions with a lower count of associations. As an example, consider a result set of three items, "Red Dress," "Red Ball," and "Fast Car." The "Red Dress" item may be associated with a "Red" promotion and a "Clothes" promotion. The "Red Ball" item may be associated with the "Red" promotion only. The "Fast Car" item may be associated with a "Deals on Wheels" promotion. Accordingly, the "Red" promotion would be the highest ranked because it has two associations. The "Clothes" and "Deals on Wheels" promotions would be tied at a lower rank with one association each. Other promotions would be unranked or tied at the lowest rank, with no associations.

The result set itself may be ranked. For example, items in the result set that have the search terms in the title of the item rather than the description of the item may be ranked as more responsive to the search. As another example, items in the result set that have a better click-through rate may be ranked as more responsive to the search. The rank of the items may be used to rank the associated promotions. For example, each association of a promotion with a higher-ranked item may be given more weight than each association of a promotion with a lower-ranked item.

In the operation 1250, the selection module 230 determines which promotions to present based on their ranks For example, the selection module 230 may select the "Red" promotion for presentation based on its having a higher rank than any other available promotion.

In the operation 1260, the communication module 210 transmits all or a portion of the result set, along with the selected promotions, to the client machine 110 or 112. After receiving the results and promotions, the client machine 110 or 112 may present them to a user, via the user interface module 320.

Figure 13:
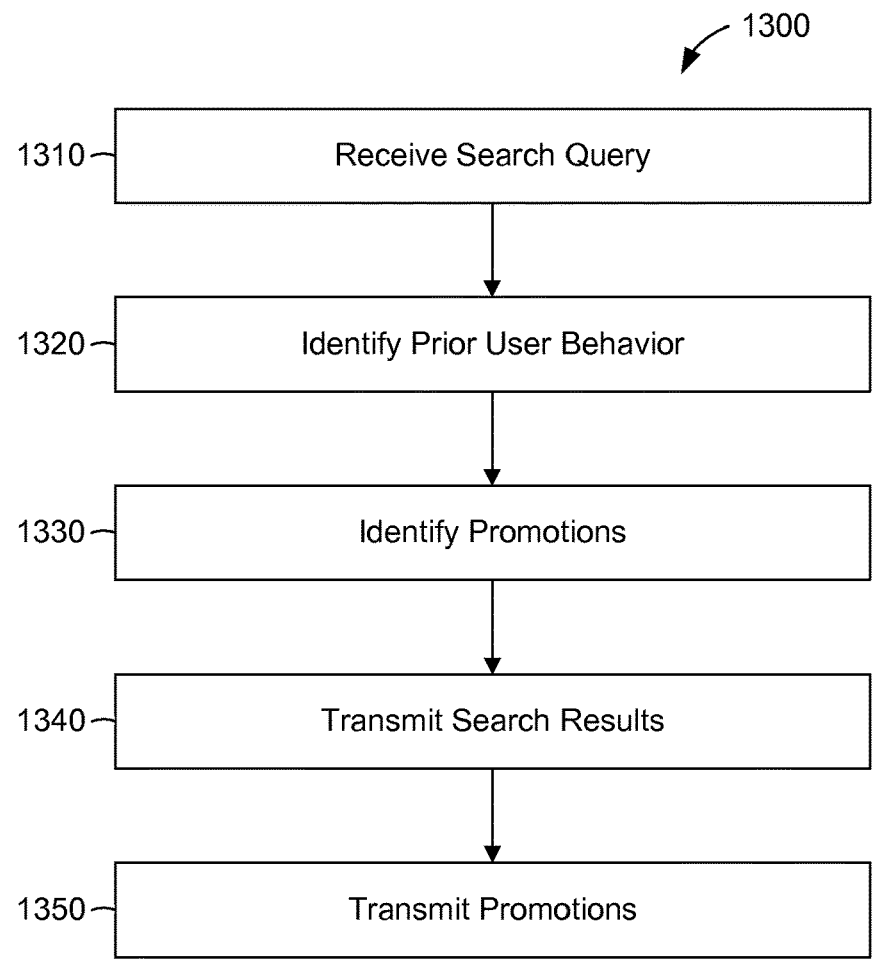
FIG. 13 is a flowchart illustrating operations of an application server, according to some example embodiments, in performing methods of selecting contextual promotions.

FIG. 13 is a flowchart illustrating operations of an application server 118 in performing a method 1300 of selecting contextual promotions, according to some example embodiments. Operations in the method 1300 may be performed by the application server 118, using modules described above with respect to FIG. 2. As shown in FIG. 13, the method 1300 includes operations 1310, 1320, 1330, 1340, and 1350.

The application server 118 may receive a search query (operation 1310). Based on the search query, the application server 118 may identify prior user behavior (operation 1320). For example, the application server 118 may determine promotions that are frequently selected after the received search query. Similarly, the application server 118 may identify patterns in the searching of the user from whom the search query was received. For example, this user may frequently search for items in a particular color, by a particular manufacturer, written by a particular author, etc. Based on the usage patterns of the present user and other users, recommended promotions may be selected from a set of available promotions (operation 1330).

The application server 118 (e.g., using the selection module 230) may also determine whether or not contextual promotions should be provided at all. For example, if few items in the result set are associated with promotions, the application server 118 may decide not to present a contextual promotion. The number of contextual promotions, or whether or not to provide contextual promotions, may be determined based on the size of the user's display or the view type (e.g., list view or gallery view). For example, contextual promotions may be provided for 940 pixel tablets, but not for 760 pixel phones. As another example, contextual promotions may be provided in a list view, but not in a gallery view. Additionally, a list may be kept of search queries, users, or keywords for which contextual promotions are disabled. When the corresponding search query or keyword is received, or a query for a corresponding user is received, no contextual promotions may be selected for presentation to the user.

The search results may be transmitted to the client machine 110 or 112 (operation 1340), for example, in an HTML page. The contextual promotions may also be transmitted to the client machine 110 or 112 (operation 1350). For example, the contextual promotions may be transmitted in the same HTML page as the search results, in a separate HTML page (e.g., included in the result page as a frame), as a JSON object, etc.

The effectiveness of the contextual promotions may also be tracked. For example, the number of interactions with the contextual promotions may be identified and compared to the previous number of interactions with the search results. If users are more likely to interact with the contextual promotions than search results, that may indicate that the contextual promotions are desired. Additionally or alternatively, the number of users that choose to clear the contextual promotions after activating them can be tracked. If many users choose to clear the contextual promotions, that may indicate that the contextual promotions are not benefiting the users. A third element that may be tracked is the success rate of sessions in which the user activates contextual promotions. An improvement in the success rate over sessions in which the user is not presented with contextual promotions may indicate that contextual promotions provide a benefit to the user or to the search result provider.

According to various example embodiments, one or more of the methodologies described herein may facilitate contextual promotions. Hence, one or more the methodologies described herein may facilitate retrieval and presentation of promotions of interest to a user without requiring the user to explicitly craft a series of queries targeting the promotion. Similarly, one or more of the methodologies described herein may facilitate retrieval and presentation of promotions of interest to a user without requiring the search provider to associate the promotions with search terms.

When these effects are considered in aggregate, one or more of the methodologies described herein may obviate a need for certain efforts or resources that otherwise would be involved in presenting promotions. Efforts expended by a user in identifying relevant queries may be reduced by one or more of the methodologies described herein. Efforts expended by a search provider in identifying relevant promotions may be reduced by one or more of the methodologies described herein. Computing resources used by one or more machines, databases, or devices (e.g., within the client-server system 100) may similarly be reduced. Examples of such computing resources include processor cycles, network traffic, memory usage, data storage capacity, power consumption, and cooling capacity.

Modules, Components and Logic

Certain embodiments are described herein as including logic or a number of components, modules, or mechanisms. Modules may constitute hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 14:
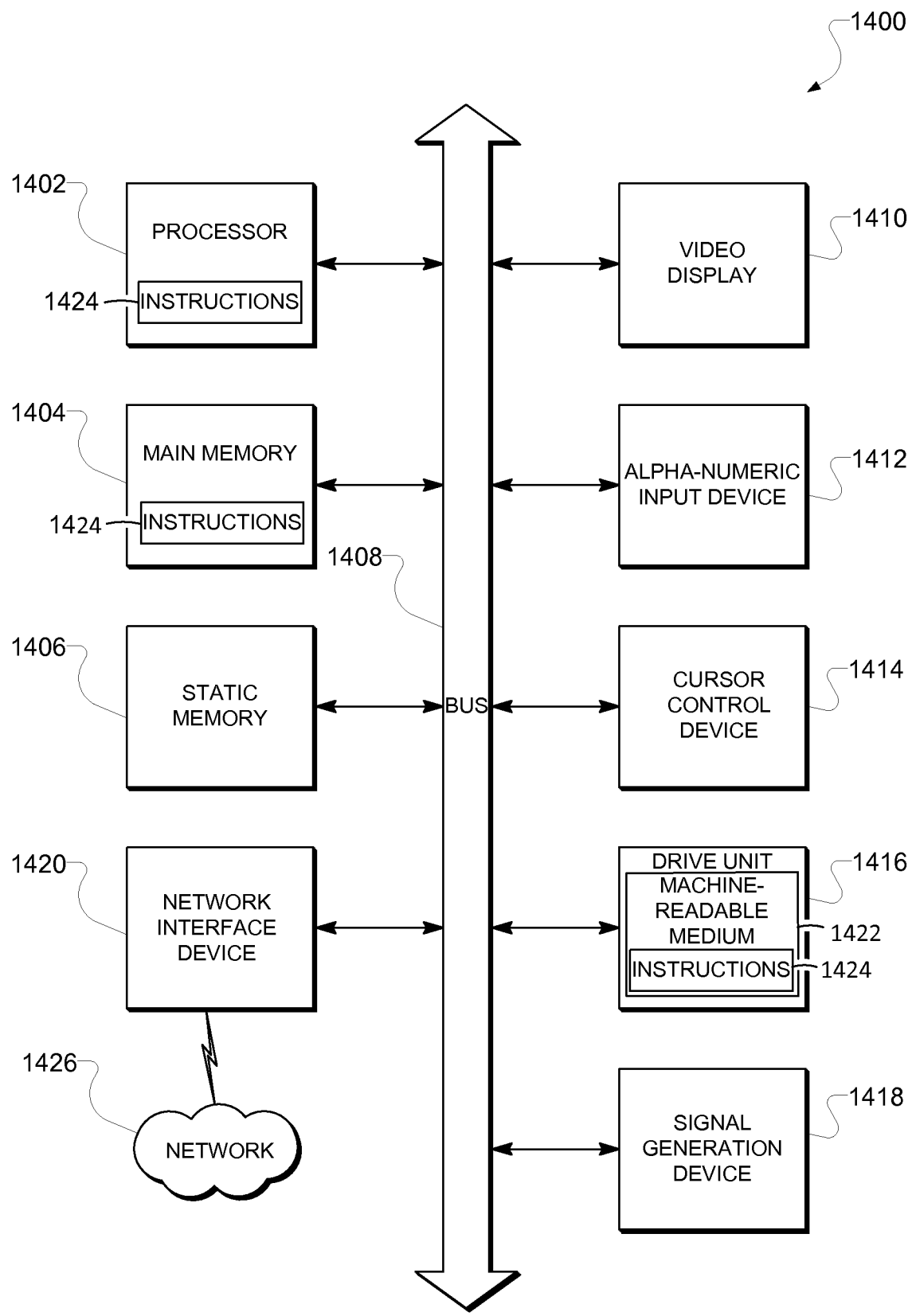
FIG. 14 is a block diagram illustrating components of a machine, according to some example embodiments, able to read instructions from a machine-readable medium and perform any one or more of the methodologies discussed herein.

FIG. 14 is a block diagram of machine in the example form of a computer system 1400 within which instructions, for causing the machine to perform any one or more of the methodologies discussed herein, may be executed. For example, the servers 118 and 130 and the client machines 110 and 112 may be implemented using the example computer system 1400. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a smart phone, a tablet, a wearable device (e.g., a smart watch or smart glasses), a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1400 includes a processor 1402 (e.g., a central processing unit (CPU), a graphics processing unit (GPU) or both), a main memory 1404 and a static memory 1406, which communicate with each other via a bus 1408. The computer system 1400 may further include a video display unit 1410 (e.g., a liquid crystal display (LCD) or a cathode ray tube (CRT)). The computer system 1400 also includes an alphanumeric input device 1412 (e.g., a keyboard or a touch-sensitive display screen), a user interface (UI) navigation (or cursor control) device 1414 (e.g., a mouse), a disk drive unit 1416, a signal generation device 1418 (e.g., a speaker) and a network interface device 1420.

Machine-Readable Medium

The disk drive unit 1416 includes a machine-readable medium 1422 on which is stored one or more sets of data structures and instructions 1424 (e.g., software) embodying or utilized by any one or more of the methodologies or functions described herein. The instructions 1424 may also reside, completely or at least partially, within the main memory 1404 and/or within the processor 1402 during execution thereof by the computer system 1400, the main memory 1404 and the processor 1402 also constituting machine-readable media.

While the machine-readable medium 1422 is shown in an example embodiment to be a single medium, the term "machine-readable medium" may include a single medium or multiple media (e.g., a centralized or distributed database, and/or associated caches and servers) that store the one or more data structures or instructions 1424. The term "machine-readable medium" shall also be taken to include any tangible medium that is capable of storing, encoding or carrying instructions 1424 for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and CD-ROM and DVD-ROM disks.

Transmission Medium

The instructions 1424 may further be transmitted or received over a communications network 1426 using a transmission medium. The instructions 1424 may be transmitted using the network interface device 1420 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi and WiMax networks). The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The invention claimed is:

1. A computer-implemented method for a search server to provide secondary content based on primary content in search results, the method comprising:
   storing, in one or more databases accessible to the search server, a plurality of primary content items, a plurality of secondary content items, and associations between the plurality of primary content items and the plurality of secondary content items;
   receiving, at the search server, a search query communicated from a client machine over a communications network to the search server;
   querying the one or more databases storing the plurality of primary content items to identify a search result set of primary content items relevant to the search query;
   querying the one or more databases to identify one or more secondary content items;
   selecting a plurality of secondary content items that have at least one association between each secondary content item and the search result set of primary content items in the one or more databases;
   ranking the plurality of secondary content items based on the number of associations;
   determining a subset of the plurality of secondary content items based on the ranking of the plurality of secondary content items; and
   transmitting the search result set and the subset of secondary content items from the search server over the communications network to the client machine for presentation by the client machine.

2. The method of claim 1, wherein:
   the search query is received from a user of the client machine; and
   the plurality of secondary content items are further selected based on actions of other users after submitting other search queries matching the search query.

3. The method of claim 2, wherein the plurality of secondary content items are selected based on usage metrics in successful sessions of the other users.

4. The method of claim 2, wherein the plurality of secondary content items are selected based on usage metrics in unsuccessful sessions of the other users.

5. The method of claim 1, wherein:
   the search query is received from a user of the client machine; and
   the plurality of secondary content items are further selected based on prior actions of the user after submitting other search queries.

6. The method of claim 5, wherein the plurality of secondary content items are selected based on usage metrics in successful sessions of the user.

7. The method of claim 5, wherein the plurality of secondary content items are selected based on usage metrics in unsuccessful sessions of the user.

8. The method of claim 5, wherein a number of secondary content items to select and transmit to the client machine is identified based on a propensity of the user to interact with secondary content items determined from the prior actions of the user after submitting other search queries.

9. The method of claim 1, wherein the plurality of secondary content items are further selected based on a context of the search query.

10. The method of claim 9, wherein the plurality of secondary content items are selected based on usage metrics in successful sessions associated with the context.

11. The method of claim 9, wherein the plurality of secondary content items are selected based on usage metrics in unsuccessful sessions associated with the context.

12. A non-transitory machine-readable storage medium embodying instructions that, when executed by a machine, cause the machine to perform operations, the operations comprising:
    storing, in one or more databases accessible to a search server, a plurality of primary content items, a plurality of secondary content items, and associations between the plurality of primary content items and the plurality of secondary content items;
    receiving, at the search server, a search query communicated from a client machine over a communications network to the search server;
    querying the one or more databases storing the plurality of primary content items to identify a search result set of primary content items relevant to the search query;
    querying the one or more databases to identify one or more secondary content items;
    selecting a plurality of secondary content items that have at least one association between each secondary content item and the search result set of primary content items in the one or more databases;
    ranking the plurality of secondary content items based on the number of associations;
    determining a subset of the plurality of secondary content items based on the ranking of the plurality of secondary content items; and
    transmitting the search result set and the subset of secondary content items from the search server over the communications network to the client machine for presentation by the client machine.

13. The machine-readable storage medium of claim 12, wherein:
    the search query is received from a user of the client machine; and
    the plurality of secondary content items are selected based on usage metrics in successful sessions of other users and/or usage metrics in unsuccessful sessions of the other users.

14. The machine-readable storage medium of claim 12, wherein:
    the search query is received from a user of the client machine; and
    the plurality of secondary content items are selected based on usage metrics in successful sessions of the user and/or usage metrics in unsuccessful sessions of the user.

15. The machine-readable storage medium of claim 14, wherein a number of secondary content items to select and transmit to the client machine is identified based on a propensity of the user to interact with secondary content items determined from the usage metrics in successful sessions of the user and/or the usage metrics in unsuccessful sessions of the user.

16. The machine-readable storage medium of claim 12, wherein the plurality of secondary content items are further selected based on a context of the search query.

17. The machine-readable storage medium of claim 16, wherein the plurality of secondary content items are selected based on usage metrics in successful sessions associated with the context and/or usage metrics in unsuccessful sessions associated with the context.

18. A search server comprising:
    one or more databases storing: a plurality of primary content items, a plurality of secondary content items, and associations between the plurality of primary content items and the plurality of secondary content items;
    one or more processors; and
    one or more machine-readable storage media storing instructions that, when used by the one or more processors, cause the one or more processors to:
    receive, at the search server, a search query communicated from a client machine over a communications network to the search server;
    query the one or more databases storing the plurality of primary content items to identify a search result set including a set of primary content items relevant to the search query;
    query the one or more databases to identify one or more secondary content items;
    select a plurality of secondary content items that have at least one association between each secondary content item and the search result set of primary content items in the one or more databases;
    ranking the plurality of secondary content items based on the number of associations;
    determining a subset of the plurality of secondary content items based on the ranking of the plurality of secondary content items; and
    transmit the search result set and the subset of secondary content items from the search server over the communications network to the client machine for presentation by the client machine.

19. The search server of claim 18, wherein:
    the search query is received from a user of the client machine; and
    the plurality of secondary content items are selected based on usage metrics in successful sessions of other users and/or usage metrics in unsuccessful sessions of the other users.

20. The search server of claim 18, wherein:
    the search query is received from a user of the client machine; and
    the plurality of secondary content items are selected based on usage metrics in successful sessions of the user and/or usage metrics in unsuccessful sessions of the user.

* * * * *